(12) United States Patent
Schueller et al.

(10) Patent No.: US 12,415,910 B2
(45) Date of Patent: Sep. 16, 2025

(54) POLYETHYLENE COMPOSITION FOR BLOW MOLDING HAVING AN IMPROVED SWELL BEHAVIOR

(71) Applicant: Basell Polyolefine GmbH, Wesseling (DE)

(72) Inventors: Ulf Schueller, Weiterstadt (DE); Sebastian Wilhelm, Mainz-Kastel (DE); Harald Schmitz, Weinheim (DE); Andreas Maus, Frankfurt (DE); Bernd Lothar Marczinke, Römerberg (DE); Elke Damm, Bad Vilbel (DE); Gerhardus Meier, Frankfurt (DE); Eric D. Day, Florence, KY (US); Sameer D. Mehta, Mason, OH (US); Harilaos Mavridis, Lebanon, OH (US)

(73) Assignee: Basell Polyolefine GmbH, Wesseling (DE)

( * ) Notice: Subject to any disclaimer, the term of this patent is extended or adjusted under 35 U.S.C. 154(b) by 381 days.

(21) Appl. No.: 17/945,317

(22) Filed: Sep. 15, 2022

(65) Prior Publication Data
US 2024/0093008 A1   Mar. 21, 2024

(51) Int. Cl.
| | |
|---|---|
| *C08L 23/06* | (2006.01) |
| *B65D 1/02* | (2006.01) |
| *B65D 23/10* | (2006.01) |
| *C08F 2/38* | (2006.01) |
| *C08F 110/02* | (2006.01) |
| *B29C 49/00* | (2006.01) |
| *B29K 23/00* | (2006.01) |

(52) U.S. Cl.
CPC ............ *C08L 23/06* (2013.01); *B65D 1/0207* (2013.01); *B65D 23/10* (2013.01); *C08F 2/38* (2013.01); *C08F 110/02* (2013.01); *B29C 49/0005* (2013.01); *B29K 2023/065* (2013.01)

(58) Field of Classification Search
CPC .............................. C08F 10/02; C08F 2500/12
See application file for complete search history.

(56) References Cited

U.S. PATENT DOCUMENTS

| | | |
|---|---|---|
| 4,399,054 A | 8/1983 | Ferraris et al. |
| 4,469,648 A | 9/1984 | Ferraris et al. |
| 4,603,173 A | 7/1986 | Mack et al. |
| 4,829,034 A | 5/1989 | Iiskolan et al. |
| 5,100,849 A | 3/1992 | Miya et al. |
| 5,486,575 A | 1/1996 | Schroff |
| 5,534,472 A | 7/1996 | Winslow et al. |
| 5,578,541 A | 11/1996 | Sacchetti et al. |
| 6,388,028 B2 | 5/2002 | Sacchetti et al. |
| 6,627,710 B1* | 9/2003 | Sacchetti ............... C08F 10/00 502/103 |
| 9,352,308 B2 | 5/2016 | Braganca |
| 9,487,607 B2 | 11/2016 | Sohn |
| 9,580,584 B2 | 2/2017 | Hoecker |
| 10,259,892 B2 | 4/2019 | Meier |
| 10,435,548 B2 | 10/2019 | Garg |
| 11,332,549 B2 | 5/2022 | Yu |
| 11,332,553 B2 | 5/2022 | Kim |
| 11,466,144 B2 | 10/2022 | Grazzi |
| 2012/0220747 A1 | 8/2012 | Jaker et al. |
| 2013/0085244 A1 | 4/2013 | Zhao et al. |
| 2016/0237238 A1* | 8/2016 | Hoecker ................ B65D 25/02 |
| 2021/0155783 A1 | 5/2021 | Hildebrandt |
| 2022/0048016 A1 | 2/2022 | Holtcamp et al. |
| 2024/0093008 A1 | 3/2024 | Schueller |
| 2024/0093010 A1 | 3/2024 | Schueller |

FOREIGN PATENT DOCUMENTS

| | | |
|---|---|---|
| EP | 395083 A2 | 10/1990 |
| EP | 0601524 A1 | 6/1994 |
| EP | 2818509 A1 | 12/2014 |
| WO | 9844009 A1 | 10/1998 |
| WO | 2005019280 A1 | 3/2005 |
| WO | 2005044866 A1 | 5/2005 |
| WO | 2007015927 A1 | 2/2007 |
| WO | 2008088464 A1 | 7/2008 |
| WO | 2010025342 A2 | 3/2010 |
| WO | 2015197453 A1 | 12/2015 |
| WO | 2016141020 A1 | 9/2016 |
| WO | 2018095700 A1 | 5/2018 |
| WO | 2018095701 A1 | 5/2018 |
| WO | 2018095702 A1 | 5/2018 |
| WO | 2018147968 A1 | 8/2018 |

OTHER PUBLICATIONS

Search Report & Written Opinion for International Application No. PCT/EP2023/075131 dated Dec. 6, 2023.
Search Report & Written Opinion for International Application No. PCT/EP2023/075129 dated Dec. 6, 2023.
Search Report & Written Opinion for International Application No. PCT/EP2023/075136 dated Dec. 6, 2023.

* cited by examiner

*Primary Examiner* — Robert C Boyle

(57) ABSTRACT

A polyethylene composition particularly suited for producing blow-molded hollow articles, having the following features:
1) density from 0.948 to 0.960 g/cm³;
2) ratio MIF/MIE greater than 125;
3) MIF from 20 to 40 g/10 min.;
4) ER values from 5 to 10.

10 Claims, 2 Drawing Sheets

POLYETHYLENE COMPOSITION FOR BLOW MOLDING HAVING AN IMPROVED SWELL BEHAVIOR

FIELD OF THE INVENTION

The present disclosure relates to a polyethylene composition which is suitable for producing small articles by blow molding.

BACKGROUND OF THE INVENTION

Examples of compositions suited for the said use are disclosed in WO2018095700, WO2018095701 and WO2018095702.

Said compositions, due to a proper selection of their molecular structure and rheological behavior, achieve a particularly high Environmental Stress Cracking Resistance (ESCR) in a broad density range, in combination with an extremely smooth surface of the final article, with reduced gel content.

At high density levels the ESCR is lowered, but still satisfactory.

However, a critical aspect of blow molding, which may require optimization, is the swelling behavior of the polymer composition.

In fact, the overall quality level and quality consistence of the blow molded article strongly depend upon swelling.

For instance, in extrusion blow molding the parison swell is of high importance.

The parison swell has two components: weight swell and diameter swell.

Weight swell can occur during the short time the molds are open and the parisons are dropping. The parisons may actually shrink in length and concurrently their walls thicken and become heavier.

A too high weight swell should be avoided, especially for the production of blown articles with thin, constant wall thickness and low weight. Die adjustments could be critical.

If the resin used has too high a weight swell, an attempt is often made to reduce weight by decreasing the die gap.

However, decreasing the die gap can yield a very thin parison that quickly collapses and folds.

Moreover, narrow die gaps are extremely sensitive to impurities. Narrow die gaps also result in high shear which can lead to high diameter swell in the parison. The final bottle may be complete, but surrounded by heavy flash. Pleating can also be an issue.

Thus the weight swell should be maintained within practical limits, with respect to commonly used industrial standards.

Due to diameter swell, the parison balloons outwards from the die; in other words, the parison's diameter becomes considerably larger than the die diameter.

The diameter swell is particularly critical for blow molded articles (in particular bottles) comprising a handle portion, thus generally called "handleware".

In this case, the diameter swell can be expressed in terms of distance (length), e.g. in centimeters, the flash extends from the neck of the handleware item (including the protruding flash) to and possibly beyond the handle area.

In fact, a resin with too low diameter swell may cause lower handle webbing and in severe cases, even blowouts.

In this case, the parison is caught in two places by the inner handle pinch-off.

When blown, these areas meet to form a heavy area known as a web.

As previously said, a resin with too high diameter swell will produce undesirable amounts of flash and consequently also cause trimming problems.

In conclusion, it is of great importance to provide a polyethylene composition with inherently good and consistent swell behavior.

It is known that the swell behavior of polyethylene compositions can be modified by treatment with radical initiators, in particular peroxides, as disclosed for instance in U.S. Pat. Nos. 4,603,173 and 5,486,575.

It has now been found that by properly setting the molecular structure and selected rheological properties of the polyethylene composition, for instance by post-polymerization treatment with radical initiators, a particularly favorable balance of parison swell and mechanical properties, with reduced gel content, is achieved.

SUMMARY OF THE INVENTION

Thus present disclosure provides a polyethylene composition having the following features:

1) ratio MIF/MIE greater than 125, preferably equal to or greater than 130, more preferably equal to or greater than 132, in particular from greater than 125 to 180 or from 130 to 180 or from 132 to 180, where MIF is the melt flow index at 190° C. with a load of 21.60 kg, and MIE is the melt flow index at 190° C. with a load of 2.16 kg, both determined according to ISO 1133-1 2012-03;
2) MIF from 20 to 40 g/10 min., preferably from 25 to 35 g/10 min., more preferably from 25 to 34 g/10 min.;
3) density from 0.948 to 0.960 g/cm$^3$, in particular from 0.950 to 0.958 g/cm$^3$, determined according to ISO 1183-1:2012 at 23° C.;
4) ER values from 5 to 10, preferably from 5.2 to 9;

where ER is calculated from:

$$ER=(1.781*10^{-3})*G'$$

at a value of G"=5,000 dyn/cm$^2$;
wherein:
G'=storage-modulus;
G"=loss-modulus;
both G' and G" being measured with dynamic oscillatory shear in a plate-plate rotational rheometer at a temperature of 190° C.

Said polyethylene composition can be easily processed in conventional blow molding apparatuses, as it fulfills the industrial requirements in terms of weight swell and diameter swell.

BRIEF DESCRIPTION OF THE DRAWINGS

These and other features, aspects, and advantages of the present disclosure will become better understood with reference to the following description and appended claims, and accompanying drawing figure where:

Figure 1:
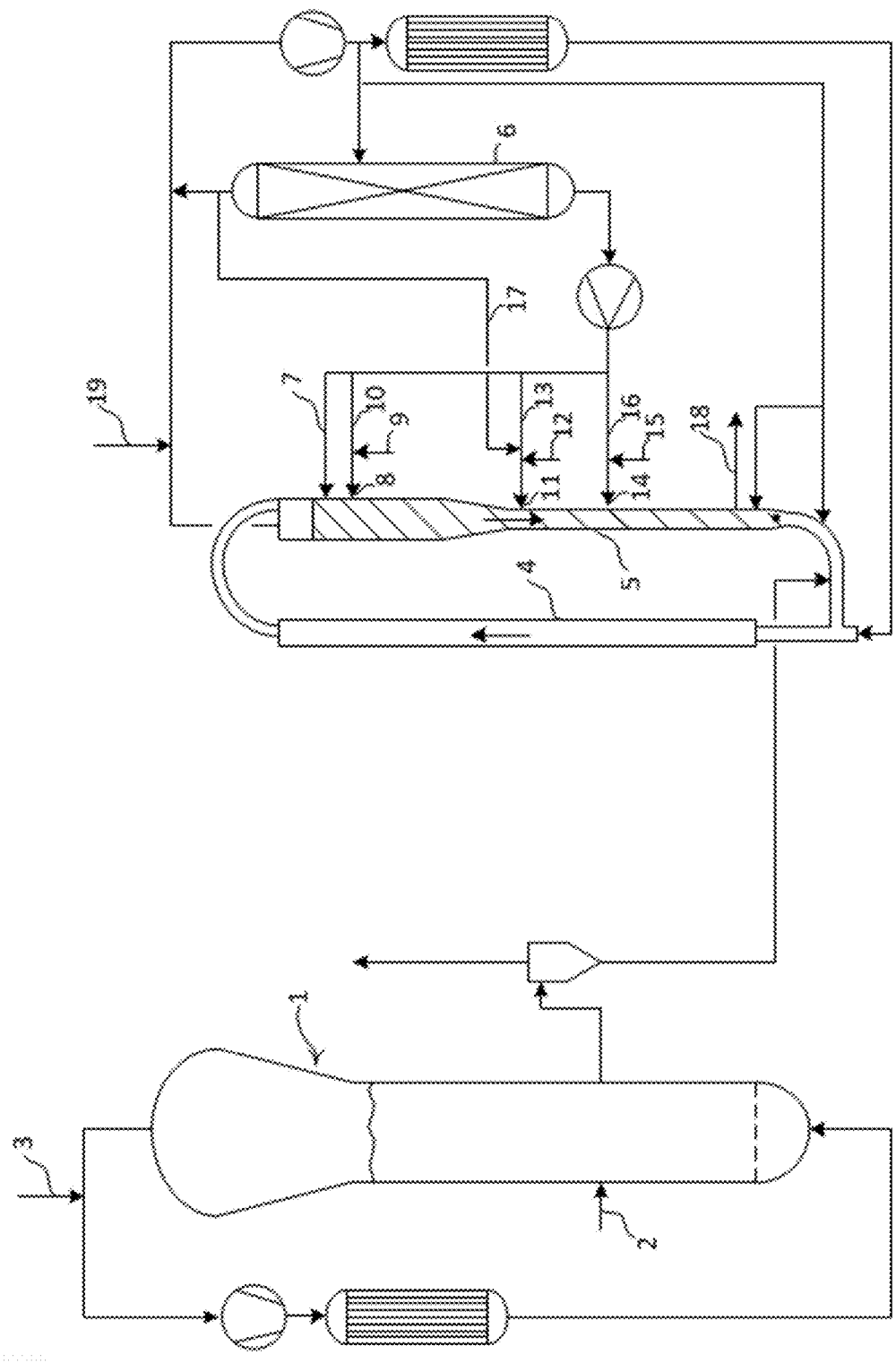
FIG. 1 is an illustrative embodiment of a simplified process-flow diagram of two serially connected gas-phase reactors suitable for use in accordance with various embodiments of ethylene polymerization processes disclosed herein to produce various embodiments of the polyethylene composition disclosed herein.

It should be understood that the various embodiments are not limited to the arrangements and instrumentality shown in the drawing figure.

DETAILED DESCRIPTION OF THE INVENTION

The expression "polyethylene composition" is intended to embrace, as alternatives, both a single ethylene polymer and an ethylene polymer composition, in particular a composition of two or more ethylene polymer components, preferably with different molecular weights, such composition being also called "bimodal" or "multimodal" polymer in the relevant art.

Typically the present polyethylene composition consists of or comprises one or more ethylene copolymers.

All the features herein defined, comprising the previously defined features 1) to 4), are referred to the said ethylene polymer or ethylene polymer composition. The addition of other components, like the additives normally employed in the art, can modify one or more of said features.

The ratio MIF/MIE provides a rheological measure of molecular weight distribution.

Another measure of the molecular weight distribution is provided by the ratio $M_w/M_n$, where $M_w$ is the weight average molecular weight and $M_n$ is the number average molecular weight, measured by GPC (Gel Permeation Chromatography), as explained in the examples.

Preferred $M_w/M_n$ values for the present polyethylene composition range from 15 to 35, in particular from 20 to 35.

The $M_w$ values are preferably from 150,000 g/mol to 450,000 g/mol, in particular from 150,000 g/mol to 350,000 g/mol.

Moreover the present polyethylene composition has preferably at least one of the following additional features:
- comonomer content equal to or less than 1.7% by weight, in particular from 0.1 to 1.7% by weight (FTIR), with respect to the total weight of the composition;
- MIP of 0.3 g/10 min. or higher, more preferably of 0.5 g/10 min. or higher, in particular from 0.3 to 4 g/10 min., or from 0.5 to 4 g/10 min., where MIP is the melt flow index at 190° C. with a load of 5 kg, determined according to ISO 1133-1 2012-03;
- ratio (MIF/MIE)/ER, which is between MIF/MIE and ER, of equal to or less than 26, more preferably of equal to or less than 25.5, in particular from 26 to 15, or from 25.5 to 15, or from 26 to 20, or from 25.5 to 20;
- long chain branching index LCBI equal to or greater than 0.55, more preferably equal to or greater than 0.60, the upper limit being preferably of 0.95 in all cases;
- where LCBI is the ratio of the measured mean-square radius of gyration Rg, measured by GPC-MALLS, to the mean-square radius of gyration for a linear PE having the same molecular weight at a mol. weight of 1,000,000 g/mol;
- $\eta_{0.02}$ equal to or greater than 56,000 Pa·s, in particular from 56,000 to 80,000 Pa·s; where $\eta_{0.02}$ is the complex viscosity of the melt, measured at a temperature of 190° C., in a parallel-plate (or so-called plate-plate) rheometer under dynamic oscillatory shear mode with an applied angular frequency of 0.02 rad/s;
- ratio ($\eta_{0.02}$/1000)/LCBI, which is between $\eta_{0.02}$ divided by 1000 and LCBI, from 85 to 150, preferably from 90 to 130;
- HMWcopo index from 0.5 to 5, in particular from 0.5 to 3.5;

where the HMWcopo index is determined according to the following formula:

$$HMWcopo = (\eta_{0.02} \times t_{maxDSC})/(10^5)$$

where $t_{maxDSC}$ is the time, in minutes, required to reach the maximum value of heat flow (in mW) of crystallization (time at which the maximum crystallization rate is achieved, equivalent to the t½ crystallization half-time) at a temperature of 124° C. under quiescent conditions, measured in isothermal mode in a differential scanning calorimetry apparatus, DSC.

The comonomer or comonomers present in the ethylene copolymers are generally selected from olefins having formula $CH_2=CHR$ wherein R is an alkyl radical, linear or branched, having from 1 to 10 carbon atoms.

Specific examples are propylene, butene-1, pentene-1, 4-methylpentene-1, hexene-1, octene-1 and decene-1. A particularly preferred comonomer is hexene-1.

Preferably, the present polyethylene composition is obtained by using, in the polymerization stage, a Ziegler-Natta polymerization catalyst, details of which are hereinafter provided.

As previously said, the present polyethylene composition can be advantageously used for producing blow molded articles, in particular handleware, like bottles with a handle portion, with valuable properties.

In fact it is preferably characterized by an environmental stress crack resistance, measured by FNCT 6 MPa/50° C., equal to or higher than 40h, in particular from 40 to 100h.

The gel content of the present polyethylene composition is preferably of less than 10 gels/m², more preferably of less than 5 gels/m², having diameter greater than 450 μm.

The total gel content is preferably of less than 500 gels/m², more preferably of less than 400 gels/m².

The swell ratio of the present polyethylene composition is preferably equal to or higher than 160%, in particular from 160% to 200%.

The details of the test methods are given in the examples.

The blow-molding process is generally carried out by first plastifying the polyethylene composition in an extruder at temperatures in the range from 180 to 250° C. and then extruding it through a die into a blow mold, where it is cooled.

In a preferred embodiment, the present polyethylene composition having the above defined features is obtained by contacting with a radical initiator a precursor polyethylene composition (I) having a ratio MIF/MIE $1^r$) lower than MIF/MIE 1) and preferably equal to or lower than 120, more preferably equal to or lower than 115, in particular from 90 to 120 or from 90 to 115; wherein the ratio 1)/$1^r$), which is between the MIF/MIE 1) of the final polyethylene composition (after contacting with the radical initiator) and the MIF/MIE $1^r$) of the precursor polyethylene composition (I), is equal to or greater than 1.05, preferably equal to or greater than 1.1, in particular from 1.05 or from 1.1 to 1.8, or from 1.05 or from 1.1 to 1.6.

Preferably, the ratio 4)/$4^r$), which is between the ER 4) of the final polyethylene composition (after contacting with the radical initiator) and the ER 41) of the precursor polyethylene composition (I), is from 1.1 to 2.5.

In a particularly preferred embodiment, the precursor polyethylene composition (I) has the following additional features:
- $2^r$) MIF from 30 to 50 g/10 min., preferably from 35 to 45 g/10 min.;
- $3^r$) density from 0.948 to 0.960 g/cm³, in particular from 0.950 to 0.958 g/cm³;

$4^r$) ER values from 2 to 5, preferably from 2 to 4.5.

Moreover the precursor polyethylene composition (I) may preferably have at least one of the following further features:

comonomer content equal to or less than 1.7% by weight, in particular from 0.1 to 1.7% by weight (FTIR), with respect to the total weight of the composition, the comonomer or comonomers being the same as reported above for the final polyethylene composition; in particular, the kind and amount of comonomer or comonomers are the same in the final polyethylene composition (after contact with the radical initiator) and in its precursor polyethylene composition (I);

MIP of 0.3 g/10 min. or higher, more preferably of 0.5 g/10 min. or higher, in particular from 0.3 to 6 g/10 min., or from 0.5 to 6 g/10 min.;

ratio (MIF/MIE)/ER, which is between MIF/MIE and ER, greater than 26, more preferably of equal to or greater than 27, in particular from greater than 26 to 40, or from 27 to 40, or from greater than 26 to 35, or from 27 to 35;

long chain branching index LCBI equal to or greater than 0.50, more preferably equal to or greater than 0.55, most preferably equal to or greater than 0.60, the upper limit being preferably of 0.90 in all cases;

$\eta_{0.02}$ lower than 56,000 Pa·s, in particular from 55,000 to 30,000 Pa·s;

ratio ($\eta_{0.02}$/1000)/LCBI, which is between $\eta_{0.02}$ divided by 1000 and LCBI, from 55 to 75, preferably from 55 to 70;

HMWcopo index from 0.5 to 5, in particular from 0.5 to 3.5;

In a particularly preferred embodiment, the precursor polyethylene composition (I) comprises:

A) 30-70% by weight, preferably 40-60% by weight of an ethylene homopolymer or copolymer (the homopolymer being preferred) with density equal to or greater than 0.960 g/cm³ and melt flow index MIE at 190° C. with a load of 2.16 kg, according to ISO 1133, of 40 g/10 min. or higher, preferably of 50 g/10 min. or higher;

B) 30-70% by weight, preferably 40-60% by weight of an ethylene copolymer having a MIE value lower than the MIE value of A), preferably lower than 0.5 g/10 min.

The above percent amounts are given with respect to the total weight of A)+B).

Specific MIE ranges for component A) are:
40 to 150 g/10 min.; or
50 to 150 g/10 min.; or
40 to 100 g/10 min.; or
50 to 100 g/10 min.

It has been found that the precursor polyethylene composition (I) can be prepared by a gas phase polymerization process in the presence of a Ziegler-Natta catalyst.

A Ziegler-Natta catalyst comprises the product of the reaction of an organometallic compound of group 1, 2 or 13 of the Periodic Table of elements with a transition metal compound of groups 4 to 10 of the Periodic Table of Elements (new notation). In particular, the transition metal compound can be selected among compounds of Ti, V, Zr, Cr and Hf and is preferably supported on $MgCl_2$.

Preferred organometallic compounds are the organo-Al compounds.

Thus in a preferred embodiment, the precursor polyethylene composition (I) is obtainable by using a Ziegler-Natta polymerization catalyst, preferably a Ziegler-Natta catalyst comprising the product of reaction of:

A) a solid catalyst component comprising a Ti, Mg, chlorine and one or more internal electron donor compounds ED;

B) an organo-Al compound; and optionally

C) an external electron donor compound $ED_{ext}$.

In particular, the solid catalyst component A) can comprise one internal electron donor ED selected from esters of aliphatic monocarboxylic acids (EAA) and another internal donor $ED^I$ selected from cyclic ethers (CE) in an amount such that the EAA/CE molar ratio ranges from 0.02 to less than 20.

Preferably, the EAA/CE molar ratio ranges from 0.2 to 16 and more preferably from 0.5 to 10.

The internal electron donor compound (EAA) is preferably selected from $C_1$-$C_{10}$, preferably $C_2$-$C_5$ alkyl esters of $C_2$-$C_{10}$, preferably $C_2$-$C_6$, aliphatic monocarboxylic acids. Among them, particularly preferred is ethyl acetate.

The (CE) internal donor is preferably selected from cyclic ethers having 3-5 carbon atoms and, among them, tetrahydrofuran, tetrahydropirane and dioxane are the most preferred with tetrahydrofuran being especially preferred.

The (EAA+CE)/Ti molar ratio is preferably higher than 1.5, and more preferably ranges from 2.0 to 10, especially from 2.5 to 8.

The content of (EAA) typically ranges from 1 to 30% wt with respect to the total weight of the solid catalyst component, more preferably from 2 to 20% wt. The content of (CE) typically ranges from 1 to 20% wt with respect to the total weight of the solid catalyst component, more preferably from 2 to 10% wt.

The Mg/Ti molar ratio preferably ranges from 5 to 50, more preferably from 10 to 40.

As disclosed above the catalyst component comprises, in addition to the electron donor compounds, Ti, Mg and chlorine. The Ti atoms preferably derive from a Ti compound containing at least a Ti-halogen bond and the Mg atoms preferably derive from a magnesium dichloride. Preferred titanium compounds are the tetrahalides or the compounds of formula $TiX_n(OR^1)_{4-n}$, where $0<n<3$, X is halogen, preferably chlorine, and $R^1$ is $C_1$-$C_{10}$ hydrocarbon group. Titanium tetrachloride is the preferred titanium compound.

The catalyst component of the present disclosure can be prepared according to different methods.

One preferred method comprises the following steps: (a) contacting a $MgX_2(R^2OH)_m$ adduct in which $R^2$ groups are $C_1$-$C_{20}$ hydrocarbon groups and X is halogen, with a liquid medium comprising a Ti compound having at least a Ti—Cl bond, in an amount such that the Ti/Mg molar ratio is greater than 3, thereby forming a solid intermediate;

(b) contacting the internal donor compounds (EAA) and (CE) as previously defined with the solid intermediate product coming from (a) followed by washing the resulting product.

Preferred starting $MgX_2(R^2OH)_m$ adducts are those in which $R^2$ groups are $C_1$-$C_{10}$ alkyl groups, X is chlorine and m is from 0.5 to 4, more preferably from 0.5 to 2. Adducts of this type can generally be obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. Nos. 4,469,648, 4,399,054, and WO98/44009. Another useable method for the spherulization is the spray cooling method described for example in U.S. Pat. Nos. 5,100,849 and 4,829,034.

Particularly interesting are the $MgCl_2(EtOH)_m$ adducts in which m is from 0.15 to 1.5 and particle size ranging from 10 to 100 μm obtained by subjecting the adducts with a higher alcohol content to a thermal dealcoholation process carried out in nitrogen flow at temperatures comprised between 50 and 150° C. until the alcohol content is reduced to the above value. A process of this type is described in EP 395083.

The dealcoholation can also be carried out chemically by contacting the adduct with compounds capable of reacting with the alcohol groups.

Generally these dealcoholated adducts are also characterized by a porosity (measured by mercury method) due to pores with radius up to 1 μm ranging from 0.15 to 2.5 $cm^3/g$, preferably from 0.25 to 1.5 $cm^3/g$.

The reaction with the Ti compound can be carried out by suspending the adduct in $TiCl_4$ (which is generally cold); subsequently the mixture is heated up to temperatures ranging from 80-130° C. and kept at this temperature for 0.5-2 hours. The treatment with the titanium compound can be carried out one or more times. Preferably, it is carried out two times. At the end of the process the intermediate solid is recovered by separation of the suspension via the conventional methods (such as settling and removing of the liquid, filtration and centrifugation) and can be subject to washings with solvents. Although the washings are typically carried out with inert hydrocarbon liquids, it is also possible to use more polar solvents (having for example a higher dielectric constant) such as halogenated hydrocarbons.

As mentioned above, the intermediate solid is, in step (b) brought into contact with the internal donor compounds under conditions such as to fix on the solid an amount of donors such that the EAA/CE molar ratio ranging from 0.02 to less than 20 is fulfilled.

Although not strictly required the contact is typically carried out in a liquid medium such as a liquid hydrocarbon. The temperature at which the contact takes place can vary depending on the nature of the reagents. Generally, it is comprised in the range from −10° to 150° C. and preferably from 0° to 120° C. It is clear that temperatures causing the decomposition or degradation of any specific reagents should be avoided even if they fall within the generally suitable range. Also the time of the treatment can vary in dependence of other conditions such as the nature of the reagents, temperature, concentration etc. As a general indication, this contact step can last from 10 minutes to 10 hours more frequently from 0.5 to 5 hours. If desired, in order to further increase the final donor content, this step can be repeated one or more times.

At the end of this step the solid is recovered by separation of the suspension via conventional methods (such as settling and removing of the liquid, filtration and centrifugation) and can be subject to washings with solvents. Although the washings are typically carried out with inert hydrocarbon liquids, it is also possible to use more polar solvents (having, for example, a higher dielectric constant) such as halogenated or oxygenated hydrocarbons.

According to a specific embodiment, it is particularly preferred that after step (b) a further step (c) is carried out by subjecting the solid catalyst component coming from (b) to a thermal treatment carried out at a temperature from 70 to 150° C.

In step (c) of the method, the solid product recovered from step (b) is subject to a thermal treatment carried out at temperatures ranging from 70 to 150° C., preferably from 80° C. to 130° C., and more preferably from 85 to 100° C.

The thermal treatment can be carried out in several ways. According to one of them the solid coming from step (b) is suspended in an inert diluent like a hydrocarbon and then subject to the heating while maintaining the system under stirring.

According to an alternative technique, the solid can be heated in a dry state by inserting it in a device having jacketed heated walls. While stirring can be provided by means of mechanical stirrers placed within said device, it is preferred to cause stirring to take place by using rotating devices.

According to a still different embodiment the solid coming from (b) can be heated by subjecting it to a flow of hot inert gas such as nitrogen, preferably by maintaining the solid under fluidization conditions.

The heating time is not fixed but may vary depending on other conditions such as the maximum temperature reached. It generally ranges from 0.1 to 10 hours, more specifically from 0.5 to 6 hours. Usually, higher temperatures allow the heating time to be shorter while lower temperatures may require longer reaction times.

In the process as described, each of the steps (b)-(c) can be carried out immediately after the previous step, without the need of isolating the solid product coming from that previous step. However, if desired the solid product coming from one step can be isolated and washed before being subject to the subsequent step.

According to a specific embodiment, a preferred modification of the process comprises subjecting the solid coming from step (a) to a prepolymerization step (a2) before carrying out step (b).

The pre-polymerization can be carried out with any of the olefins $CH_2=CHR$, where R is H or a $C_1$-$C_{10}$ hydrocarbon group. In particular, it is especially preferred to pre-polymerize ethylene or propylene or mixtures thereof with one or more α-olefins, said mixtures containing up to 20% in moles of α-olefin, forming amounts of polymer from about 0.1 g up to about 1000 g per gram of solid intermediate, preferably from about 0.5 to about 500 g per gram of solid intermediate, more preferably from 0.5 to 50 g per gram of solid intermediate and especially from 0.5 to 5 g per gram of solid intermediate. The pre-polymerization step can be carried out at temperatures from 0 to 80° C., preferably from 5 to 70° C., in the liquid or gas phase. The pre-polymerization of the intermediate with ethylene or propylene in order to produce an amount of polymer ranging from 0.5 to 20 g per gram of intermediate is particularly preferred. The pre-polymerization is carried out with the use of a suitable cocatalyst such as organoaluminum compounds. When the solid intermediate is prepolymerized with propylene it is especially preferred that the prepolymerization is carried out in the presence of one or more external donors preferably selected from the group consisting of silicon compounds of the general formula $R_a^4 R_b^5 Si(OR^6)_c$, where a and b are integer from 0 to 2, c is an integer from 1 to 3 and the sum (a+b+c) is 4; $R^4$, $R^5$, and $R^6$, are alkyl, cycloalkyl or aryl radicals with 1-18 carbon atoms optionally containing heteroatoms. Particularly preferred are the silicon compounds in which a is 1, b is 1, c is 2, at least one of $R^4$ and $R^5$ is selected from branched alkyl, cycloalkyl or aryl groups with 3-10 carbon atoms optionally containing heteroatoms, and $R^6$ is a $C_1$-$C_{10}$ alkyl group, in particular methyl. Examples of such preferred silicon compounds are methylcyclohexyldimethoxysilane (C donor), diphenyldimethoxysilane, methyl-t- butyldimethoxysilane, dicyclopentyldimethoxysilane (D donor) and diisopropyldimethoxysilane.

All of the above mentioned processes are suitable for the preparation of particles of solid catalyst components having substantially spherical morphology and average diameter comprised between 5 and 150 m, preferably from 10 to 100 m. As particles having substantially spherical morphology, those are meant wherein the ratio between the greater axis and the smaller axis is equal to, or lower than 1.5, and preferably lower than 1.3.

Generally, the solid catalyst components obtained according to the above method show a surface area (by B.E.T. method) generally between 10 and 200 m$^2$/g and preferably between 20 and 80 m$^2$/g, and a total porosity (by B.E.T. method) higher than 0.15 cm$^3$/g preferably between 0.2 and 0.6 cm$^3$/g. The porosity (Hg method) due to pores with radius up to 10.000 Å generally ranges from 0.25 to 1 cm$^3$/g, preferably from 0.35 to 0.8 cm$^3$/g.

As previously explained, the catalyst components of the disclosure form polymerization catalysts by reaction with Al-alkyl compounds. In particular Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

Also, alkylaluminum halides and in particular alkylaluminum chlorides such as diethylaluminum chloride (DEAC), diisobutylaluminum chloride, Al-sesquichloride and dimethylaluminum chloride (DMAC) can be used. It is also possible to use, and in certain cases preferred, mixtures of trialkylaluminum compounds with alkylaluminum halides. Among them mixtures TEAL/DEAC and TIBA/DEAC are particularly preferred.

Optionally, an external electron donor (ED$_{ext}$) can be used during polymerization. The external electron donor compound can be equal to, or different from, the internal donors used in the solid catalyst component. Preferably, it is selected from the group consisting of ethers, esters, amines, ketones, nitriles, silanes and mixtures of the above. In particular, it can advantageously be selected from the C$_2$-C$_{20}$ aliphatic ethers and especially from cyclic ethers preferably having 3-5 carbon atoms such as tetrahydrofuran and dioxane.

In addition to the aluminium alkyl cocatalyst (B) and the possible use of an external electron donor (ED$_{ext}$) as a component (C), it is possible to use a halogenated compound (D) as activity enhancer. Said compound is preferably a mono- or dihalogenated hydrocarbon. In one preferred embodiment, it is chosen among monohalogenated hydrocarbons in which the halogen is linked to a secondary carbon atom. The halogen is preferably chosen from among chloride and bromide.

Non-limiting exemplary compounds for (D) are propylchloride, i-propylchloride, butylchloride, s-butylchloride, t-butylchloride 2-chlorobutane, cyclopentylchloride, cyclohexylchloride, 1,2-dichloroethane, 1,6-dichlorohexane, propylbromide, i-propylbromide, butylbromide, s-butylbromide, t-butylbromide, i-butylbromide i-pentylbromide, and t-pentylbromide. Among them, particularly preferred are i-propylchloride, 2-chlorobutane, cyclopentylchloride, cyclohexylchloride, 1,4-dichlorobutane and 2-bromopropane.

According to another embodiment the compounds can be chosen from among halogenated alcohols, esters or ethers such as 2,2,2,-trichloroethanol, ethyl trichloroacetate, butyl perchlorocrotonate, 2-chloro propionate and 2-chloro-tetrahydrofurane.

The activity enhancer can be used in amounts such as to have the (B)/(D) molar ratio of higher than 3 and preferably in the range 5-50 and more preferably in the range 10-40.

The above mentioned components (A)-(D) can be fed separately into the reactor under the polymerization conditions to exploit their activity. It constitutes however a particular advantageous embodiment the pre-contact of the above components, optionally in the presence of small amounts of olefins, over a period of time ranging from 1 minute to 10 hours, preferably in the range from 2 to 7 hours. The pre-contact can be carried out in a liquid diluent at a temperature ranging from 0 to 90° C. preferably in the range of 20 to 70° C.

One or more alkyl aluminum compound or mixtures thereof can be used in the pre-contact. If more than one alkylaluminum compound is used in the pre-contact, they can be used altogether or added sequentially to the pre-contact tank. Even if the pre-contact is carried out, it is not necessary to add at this stage the whole amount of aluminum alkyl compounds. A portion thereof can be added in the pre-contact while the remaining aliquot can be fed to the polymerization reactor. Moreover, when more than one aluminum alkyl compound is used, it is also possible using one or more in the precontact process and the other(s) fed to the reactor.

In one of the preferred embodiments, a precontact is carried out by first contacting the catalyst component with an aluminum trialkyl such as tri-n-hexyl aluminum (THA), then another aluminum alkyl compound, preferably, diethylaluminum chloride is added to the mixture, and finally as a third component another trialkylaluminum, preferably, triethylaluminum is added to the pre-contact mixture. According to a variant of this method, the last aluminum trialkyl is added to the polymerization reactor.

The total amount of aluminum alkyl compounds used can vary within broad ranges, but it preferably ranges from 2 to 10 mols per mole of internal donor in the solid catalyst component.

It has been found that by using the above described polymerization catalyst, the precursor polyethylene composition (I) can be prepared in a process comprising the following steps, in any mutual order:
  a) polymerizing ethylene, optionally together with one or more comonomers, in a gas-phase reactor in the presence of hydrogen;
  b) copolymerizing ethylene with one or more comonomers in another gas-phase reactor in the presence of an amount of hydrogen less than step a);
where in at least one of said gas-phase reactors the growing polymer particles flow upward through a first polymerization zone (riser) under fast fluidization or transport conditions, leave said riser and enter a second polymerization zone (downcomer) through which they flow downward under the action of gravity, leave said downcomer and are reintroduced into the riser, thus establishing a circulation of polymer between said two polymerization zones.

In the first polymerization zone (riser), fast fluidization conditions are established by feeding a gas mixture comprising one or more olefins (ethylene and comonomers) at a velocity higher than the transport velocity of the polymer particles. The velocity of said gas mixture is preferably comprised between 0.5 and 15 m/s, more preferably between 0.8 and 5 m/s. The terms "transport velocity" and "fast fluidization conditions" are well known in the art; for a definition thereof, see, for example, "D. Geldart, Gas Fluidisation Technology, page 155 et seq., J. Wiley & Sons Ltd., 1986".

In the second polymerization zone (downcomer), the polymer particles flow under the action of gravity in a densified form, so that high values of density of the solid are reached (mass of polymer per volume of reactor), which approach the bulk density of the polymer.

In other words, the polymer flows vertically down through the downcomer in a plug flow (packed flow mode), so that only small quantities of gas are entrained between the polymer particles.

Such process allows to obtain from step a) an ethylene polymer with a molecular weight lower than the ethylene copolymer obtained from step b).

Preferably, a copolymerization of ethylene to produce a relatively low molecular weight ethylene copolymer (step a) is performed upstream the copolymerization of ethylene to produce a relatively high molecular weight ethylene copolymer (step b). To this aim, in step a) a gaseous mixture comprising ethylene, hydrogen, comonomer and an inert gas is fed to a first gas-phase reactor, preferably a gas-phase fluidized bed reactor. The polymerization is carried out in the presence of the previously described Ziegler-Natta catalyst.

Hydrogen is fed in an amount depending on the specific catalyst used and, in particular, suitable to obtain in step a) an ethylene polymer with a melt flow index MIE of 40 g/10 min. or higher. In order to obtain the above MIE range, in step a) the hydrogen/ethylene molar ratio is indicatively from 1 to 4, the amount of ethylene monomer being from 2 to 20% by volume, preferably from 5 to 15% by volume, based on the total volume of gas present in the polymerization reactor. The remaining portion of the feeding mixture is represented by inert gases and one or more comonomers, if any. Inert gases which are necessary to dissipate the heat generated by the polymerization reaction are conveniently selected from nitrogen or saturated hydrocarbons, the most preferred being propane.

The operating temperature in the reactor of step a) is selected between 50 and 120° C., preferably between 65 and 100° C., while the operating pressure is between 0.5 and 10 MPa, preferably between 2.0 and 3.5 MPa.

In a preferred embodiment, the ethylene polymer obtained in step a) represents from 30 to 70% by weight of the total ethylene polymer produced in the overall process, i. e. in the first and second serially connected reactors.

The ethylene polymer coming from step a) and the entrained gas are then passed through a solid/gas separation step, in order to prevent the gaseous mixture coming from the first polymerization reactor from entering the reactor of step b) (second gas-phase polymerization reactor). Said gaseous mixture can be recycled back to the first polymerization reactor, while the separated ethylene polymer is fed to the reactor of step b). A suitable point of feeding of the polymer into the second reactor is on the connecting part between the downcomer and the riser, wherein the solid concentration is particularly low, so that the flow conditions are not negatively affected.

The operating temperature in step b) is in the range of 65 to 95° C., and the pressure is in the range of 1.5 to 4.0 MPa. The second gas-phase reactor is aimed to produce a relatively high molecular weight ethylene copolymer by copolymerizing ethylene with one or more comonomers. Furthermore, in order to broaden the molecular weight distribution of the final ethylene polymer, the reactor of step b) can be conveniently operated by establishing different conditions of monomers and hydrogen concentration within the riser and the downcomer.

To this purpose, in step b) the gas mixture entraining the polymer particles and coming from the riser can be partially or totally prevented from entering the downcomer, so to obtain two different gas composition zones. This can be achieved by feeding a gas and/or a liquid mixture into the downcomer through a line placed at a suitable point of the downcomer, preferably in the upper part thereof. Said gas and/or liquid mixture should have a suitable composition, different from that of the gas mixture present in the riser. The flow of said gas and/or liquid mixture can be regulated so that an upward flow of gas counter-current to the flow of the polymer particles is generated, particularly at the top thereof, acting as a barrier to the gas mixture entrained among the polymer particles coming from the riser. In particular, it is advantageous to feed a mixture with low content of hydrogen in order to produce the higher molecular weight polymer fraction in the downcomer. One or more comonomers can be fed to the downcomer of step b), optionally together with ethylene, propane or other inert gases.

The hydrogen/ethylene molar ratio in the downcomer of step b) is comprised between 0.005 and 0.2, the ethylene concentration being comprised from 0.5 to 15%, preferably 0.5-10%, by volume, the comonomer concentration being comprised from 0.05 to 1.5% by volume, based on the total volume of gas present in said downcomer. The rest is propane or similar inert gases. Since a very low molar concentration of hydrogen is present in the downcomer, by carrying out the present process it is possible to bond a relatively high amount of comonomer to the high molecular weight polyethylene fraction.

The polymer particles coming from the downcomer are reintroduced in the riser of step b).

Since the polymer particles keep reacting and no more comonomer is fed to the riser, the concentration of said comonomer drops to a range of 0.05 to 1.2% by volume, based on the total volume of gas present in said riser. In practice, the comonomer content is controlled in order to obtain the desired density of the final polyethylene. In the riser of step b) the hydrogen/ethylene molar ratio is in the range of 0.01 to 0.5, the ethylene concentration being comprised between 5 and 20% by volume based on the total volume of gas present in said riser. The rest is propane or other inert gases.

More details on the above described polymerization process are provided in WO2005019280.

The so obtained precursor polyethylene composition (I) is then contacted with a radical initiator.

For "contacted" it is meant that the precursor polyethylene composition (I) and the radical initiator are mixed together and reacted with each other.

The said radical initiator is preferably selected from organic peroxides.

Particularly useful organic peroxides are organic monoperoxides and/or organic diperoxides. These organic monoperoxides and diperoxides may have a half-life of 1 hour at a temperature in the range of about 125° C. to about 145° C., alternatively in the range of about 130° C. to about 140° C., alternatively in the range of about 132° C. to about 136° C. Further alternatives include organic peroxides having a half-life of 0.1 hour at a temperature in the range of about 145° C. to 165° C., or in the range of about 150° C. to about 160° C., or in the range of about 154° C. to 158° C. The organic peroxide may have a molecular weight in the range of about 175 g/mol to about 375 g/mol, alternatively in the range of about 200 g/mol to about 350 g/mol. Mixtures of two or more peroxides can be used if desired.

Suitable organic peroxides include, but are not limited to, dicumyl peroxide, di-tert-butyl peroxide, tert-butylperoxybenzoate, 2,5-dimethyl-2,5-di(tert-butylperoxy)hexane, 3,6,9-triethyl-3,6,9-trimethyl-1,2,4,5,7,8-hexoxonane, representatives of 3,6,9-trimethyl-3,6,9-tris(alkyl)-1,2,4,5,7,8-hexoxonanes in which the alkyl radical is propyl or ethyl, tert-butyl peroxyneodecanoate, tert-amyl peroxypivalate, 1,3-bis(tert-butylperoxyisopropyl)benzene, and the like.

Preferably, the organic peroxide is 2,5-dimethyl-2,5-di(tert-butylperoxy)hexane, 3,6,9-triethyl-3,6,9-trimethyl-1,2,4,5,7,8-hexoxonane, or a representative of 3,6,9-trimethyl-3,6,9-tris(alkyl)-1,2,4,5,7,8-hexoxonanes in which the alkyl radical is propyl or ethyl.

In a preferred embodiment of the present disclosure, the organic peroxide is employed in form of a polyolefin mixture, which is preferably prepared by adding the organic peroxide in pure form or as a solution in a diluent like a hydrocarbon to a polyolefin powder. Preferred polyolefin mixtures have a content of the organic peroxide in the polyolefin mixture in the range from 0.5 to 25 wt. %, preferably from 1 to 20 wt. %, and more preferably from 2 to 10 wt. %.

Preferably, the amount of added organic peroxide corresponds to a content of initiator in the precursor polyethylene composition (I) of from 10 to 100 ppm by weight, more preferably from 25 to 90 ppm by weight, and in particular from 25 to 80 ppm by weight.

The contact with the radical initiator can be carried out by any means and under the conditions known in the art to be effective for radical initiated reactions in olefin polymers.

It is known that such reactions can be run in the conventional apparatuses generally used for processing polymers in the molten state.

In particular, the polyethylene composition of the present disclosure can be prepared by contacting the precursor polyethylene composition (I) and the radical initiator in an extruder device. Suitable extruder devices are extruders or continuous mixers. These extruders or mixers can be single- or two-stage machines which melt and homogenize the polyethylene composition. Examples of extruders are pin-type extruders, planetary extruders or corotating disk processors. Other possibilities are combinations of mixers with discharge screws and/or gear pumps. Preferred extruders are screw extruders and in particular extruders constructed as twin-screw machine. Particular preference is given to twin-screw extruders and continuous mixers with discharge elements and especially to continuous mixers with counter rotating twin rotor or the extruder device comprises at least one co-rotating twin screw extruder. Machinery of this type is conventional in the plastics industry and is manufactured by, for example, Coperion GmbH, Stuttgart, Germany; KraussMaffei Berstorff GmbH, Hannover, Germany; The Japan Steel Works LTD., Tokyo, Japan; Farrel Corporation, Ansonia, USA; or Kobe Steel, Ltd., Kobe, Japan. Suitable extruder devices are further usually equipped with units for pelletizing the melt, such as underwater pelletizers.

The contact and reaction temperature is preferably in the range of from 180 to 350° C., in particular from 180 to 300° C. and is generally equal to or higher than the decomposition temperature of the radical initiator.

For most operations, and particularly large scale operations, the contact and reaction time is preferably several times the initiator's half-life. This provides a substantially complete reaction and minimizes the possibility of undesirable initiator residues in the polyethylene composition. Although low levels of undecomposed initiator are not detrimental, the presence of significant amounts of unreacted initiator can result in the formation of gels and other undesirable effects during subsequent processing of the polyethylene composition.

In addition, one or more additives can be fed to the polyethylene composition.

Feeding of these additives may occur before, during or after contacting the precursor polyethylene composition (I) with the radical initiator.

Such additives are common in the art. Suitable types of additives for preparing polyethylene compositions are, for example, antioxidants, melt stabilizers, light stabilizers, acid scavengers, lubricants, processing aids, antiblocking agents, slip agents, antistatic agents, antifogging agents, pigments or dyes, nucleating agents, flame retardants or fillers. It is common that several additives are added. The multiple additives can be different types of additives. It is however also possible that several representatives of one type of additives are added to the polyethylene composition. Additives of all these types are generally commercially available and are described, for example, in Hans Zweifel, Plastics Additives Handbook, 5th Edition, Munich, 2001.

EXAMPLES

The practice and advantages of the various embodiments, compositions and methods as provided herein are disclosed below in the following examples. These Examples are illustrative only, and are not intended to limit the scope of the appended claims in any manner whatsoever.

The following analytical methods were used to characterize the polymer compositions.

Melt Flow Index

Determined according to ISO 1133-1 2012-03 at 190° C. with the specified load.

Density

Determined according to ISO 1183-1:2012 at 23° C.

Molecular Weight Distribution Determination

The determination of the means $M_w$ and $M_n$ and of $M_w/M_n$ derived therefrom was carried out by high-temperature gel permeation chromatography using a method described in ISO 16014-1, -2, -4, issues of 2003. The specifics according to the mentioned ISO standards are as follows: Solvent 1,2,4-trichlorobenzene (TCB), temperature of apparatus and solutions 135° C. and as concentration detector a PolymerChar (Valencia, Paterna 46980, Spain) IR-4 infrared detector, capable for use with TCB. A WATERS Alliance 2000 equipped with the following pre-column SHODEX UT-G and separation columns SHODEX UT 806 M (3×) and SHODEX UT 807 (Showa Denko Europe GmbH, Konrad-Zuse-Platz 4, 81829 Muenchen, Germany) connected in series was used.

The solvent was vacuum distilled under Nitrogen and was stabilized with 0.025% by weight of 2,6-di-tert-butyl-4-methylphenol. The flowrate used was 1 ml/min, the injection was 500 µl and polymer concentration was in the range of 0.01%<conc.<0.05% w/w. The molecular weight calibration was established by using monodisperse polystyrene (PS) standards from Polymer Laboratories (now Agilent Technologies, Herrenberger Str. 130, 71034 Boeblingen, Germany)) in the range from 580 g/mol up to 11600000 g/mol and additionally with Hexadecane.

The calibration curve was then adapted to Polyethylene (PE) by means of the Universal Calibration method (Benoit H., Rempp P. and Grubisic Z., & in J. Polymer Sci., Phys. Ed., 5, 753(1967)). The Mark-Houwing parameters used herefore were for PS: $k_{PS}$=0.000121 dl/g, $\alpha_{PS}$=0.706 and for PE $k_{PE}$=0.000406 dl/g, $\alpha_{PE}$=0.725, valid in TCB at 135° C.

Data recording, calibration and calculation was carried out using NTGPC_Control_V6.02.03 and NTGPC_V6.4.24 (hs GmbH, Hauptstraße 36, D-55437 Ober-Hilbersheim, Germany) respectively.

Long Chain Branching Index (LCBI)

The LCB index corresponds to the branching factor g', measured for a molecular weight of $10^6$ g/mol. The branching factor g', which allows determining long-chain branches at high $M_w$, was measured by Gel Permeation Chromatography (GPC) coupled with Multi-Angle Laser-Light Scattering (MALLS). The radius of gyration for each fraction eluted from the GPC (as described above but with a flow-rate of 0.6 ml/min and a column packed with 30 μm particles) is measured by analyzing the light scattering at the different angles with the MALLS (detector Wyatt Dawn EOS, Wyatt Technology, Santa Barbara, Calif.). A laser source of 120 mW of wavelength 658 nm was used. The specific index of refraction was taken as 0.104 ml/g. Data evaluation was done with Wyatt ASTRA 4.7.3 and CORONA 1.4 software. The LCB Index is determined as described in the following.

The parameter g' is the ratio of the measured mean square radius of gyration to that of a linear polymer having the same molecular weight. Linear molecules show g' of 1, while values less than 1 indicate the presence of LCB. Values of g' as a function of mol. weight, M, were calculated from the equation:

$$g'(M) = <Rg^2>_{sample,M} / <Rg^2>_{linear\ ref,M}$$

where $<Rg^2>$, M is the root-mean-square radius of gyration for the fraction of mol. weight M.

The radius of gyration for each fraction eluted from the GPC (as described above but with a flow-rate of 0.6 ml/min and a column packed with 30 μm particles) is measured by analyzing the light scattering at the different angles. Therefore, from this MALLS setup it is possible to determine mol. weight M and $<Rg^2>_{sample,M}$ and to define a g' at a measured $M=10^6$ g/mol. The $<Rg^2>_{linear\ ref,M}$ is calculated by the established relation between radius-of-gyration and molecular weight for a linear polymer in solution (Zimm and Stockmayer WH 1949)) and confirmed by measuring a linear PE reference with the same apparatus and methodology described.

The same protocol is described in the following documents.

Zimm B H, Stockmayer W H (1949) *The dimensions of chain molecules containing branches and rings*. J Chem Phys 17

Rubinstein M., Colby R H. (2003), *Polymer Physics*, Oxford University Press

Complex Shear Viscosity $\eta_{0.02}$ (Eta (0.02)) and ER

Measured at angular frequency of 0.02 rad/s and 190° C. as follows.

Samples were melt-pressed for 4 min under 200° C. and 200 bar into plates of 1 mm thickness. Disc specimens of a diameter of 25 mm were stamped and inserted in the rheometer, which was pre-heated at 190° C. The measurement can be performed using any rotational rheometer commercially available. Here the Anton Paar MCR 300 was utilized, with a plate-plate geometry. A so-called frequency-sweep is performed (after 4 min of annealing the sample at the measurement temperature) at T=190° C., under constant strain-amplitude of 5%, measuring and analyzing the stress response of the material in the range of excitation frequencies ω from 628 to 0.02 rad/s. The standardized basic software is utilized to calculate the rheological properties, i.e. the storage-modulus, G', the loss-modulus, G", the phase lag δ (=arctan(G"/G')) and the complex viscosity, 1*, as a function of the applied frequency, namely $\eta^*(\omega) = [G'(\omega)^2 + G''(\omega)^2]^1$ m²/ω. The value of the latter at an applied frequency ω of 0.02 rad/s is the $\eta_{0.02}$.

ER is determined by the method of R. Shroff and H. Mavridis, "New Measures of Polydispersity from Rheological Data on Polymer Melts," J. Applied Polymer Science 57 (1995) 1605 (see also U.S. Pat. No. 5,534,472 at Column 10, lines 20-30). It is calculated from:

$$ER = (1.781 \times 10^{-3}) \times G'$$

at a value of G"=5,000 dyn/cm².

As those skilled in the art will recognize, when the lowest G" value is greater than 5,000 dyn/cm², the determination of ER involves extrapolation. The ER values calculated then will depend on the degree on nonlinearity in the log G' versus log G" plot. The temperature, plate diameter and frequency range are selected such that, within the resolution of the rheometer, the lowest G" value is close to or less than 5,000 dyne/cm².

HMWcopo Index

In order to quantify the crystallization and processability potential of the polymer, the HMWcopo (High Molecular Weight Copolymer) Index is used, which is defined by the following formula:

$$HMWcopo = (\eta_{0.02} \times t_{maxDSC}) / (10^5)$$

It is decreasing with increasing potential of easy processing (low melt-viscosity) and fast crystallization of the polymer. It is also a description and quantification of the amount of high molecular weight fraction, correlating to the melt complex shear viscosity $\eta_{0.02}$ at the frequency of 0.02 rad/s, measured as above described, and the amount of incorporated comonomer which delays the crystallization, as quantified by the maximum heat flow time for quiescent crystallization, $t_{maxDSC}$.

The $t_{maxDSC}$ is determined using a Differential Scanning Calorimetry apparatus, TA Instruments Q2000, under isothermal conditions at a constant temperature of 124° C. 5-6 mg of sample are weighted and brought into the aluminium DSC pans. The sample is heated with 20K/min up to 200° C. and cooled down also with 20K/min to the test temperature, in order to erase the thermal history. The isothermal test begins immediately after and the time is recorded until crystallization occurs. The time interval until the crystallization heat flow maximum (peak), $t_{maxDSC}$, is determined using the vendor software (TA Instruments). The measurement is repeated 3× times and an average value is then calculated (in min). If no crystallization is observed under these conditions for more than 120 minutes, the value of $t_{maxDSC}$=120 minutes is used for further calculations of the HMWcopo index.

The melt viscosity $\eta_{0.02}$ value is multiplied by the $t_{maxDSC}$ value and the product is normalized by a factor of 100000 ($10^5$).

Swell Ratio

The Swell-ratio of the studied polymers was measured utilizing a capillary rheometer, Göttfert Rheotester2000 and Rheograph25, at T=190° C., equipped with a commercial 30/2/2/20 die (total length 30 mm, Active length=2 mm, diameter=2 mm, L/D=2/2 and 200 entrance angle) and an optical device (laser-diod from Göttfert) for measuring the extruded strand thickness. Sample is molten in the capillary barrel at 190° C. for 6 min and extruded with a piston velocity corresponding to a resulting shear-rate at the die of 1440 s⁻¹.

The extrudate is cut (by an automatic cutting device from Göttfert) at a distance of 150 mm from the die-exit, at the moment the piston reaches a position of 96 mm from the die-inlet. The extrudate diameter is measured with the laser-diod at a distance of 78 mm from the die-exit, as a function of time. The maximum value corresponds to the $D_{extrudate}$. The swell-ratio is determined from the calculation:

$$SR=(D_{extrudate}-D_{die})100\%/D_{die}$$

where $D_{die}$ is the corresponding diameter at the die exit, measured with the laser-diod.

Environmental Stress Cracking Resistance According to Full Notch Creep Test (FNCT)

The environmental stress cracking resistance of polymer samples was determined in accordance to international standard ISO 16770 (FNCT) in aqueous surfactant solution. From the polymer sample a compression moulded 10 mm thick sheet has been prepared. The bars with squared cross section (10×10×100 mm) are notched using a razor blade on four sides perpendicularly to the stress direction. A notching device described in M. Fleissner in Kunststoffe 77 (1987), pp. 45 is used for the sharp notch with a depth of 1.6 mm.

The load applied is calculated from tensile force divided by the initial ligament area. Ligament area is the remaining area=total cross-section area of specimen minus the notch area. For FNCT specimen: 10×10 mm²–4 times of trapezoid notch area=46.24 mm² (the remaining cross-section for the failure process/crack propagation). The test specimen is loaded with standard condition suggested by the ISO 16770 with constant load of 6 MPa at 50° C. in a 2% (by weight) water solution of non-ionic surfactant ARKOPAL N100. Time until rupture of test specimen is detected.

Weight Swell and Diameter Swell (Uniloy Test)

The determination of weight and diameter swell was carried out by simulating industrial process conditions with a Uniloy reciprocating type blow molding machine model 5630, with a 1 gallon center fill bottle mold with an approximate parison drop time of 1.1 s.

Weight swell was determined by adjusting the bottle weight to the desired amount, 90 g, with the reference resin Petrothene LR732002 and then comparing to the weight of a bottle of the resin being examined, produced under the same machine parameters.

Figure 2:
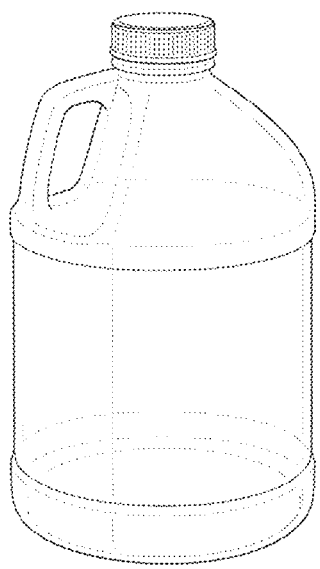
FIG. 2 depicts the test bottle used for the weight and diameter swell test. It is about 28 cm tall (excluding top and bottom flashes) and about 14 cm wide.

The test bottle is depicted in FIG. 2.

Thus the weight swell is given by:

$$W_B - 90$$

wherein $W_B$ is the weight of the tested bottle, in grams.

Diameter swell was determined by measuring the length of the flash on the bottle via graduated markings, from top (including the protruding top flash) down to and along the bottle handle at the same bottle weight as the reference resin, namely 90 g. The mold relative to the parison was adjusted so that the reference resin top flash edge fell on the 9 cm mark on the handle.

The machine parameters were:
Motor load/AMP.—~40 amps;
Screw speed—~370 rpm (adjusted to adjust parison tail length);
Hyd. Oil temperature—27-32° C. (80-90° F.);
Mold cooling temperature—Inlet 4° C. (39° F.), outlet 8° C. (47° F.);
Shot pressure—7 MPa (1050 psi);
Head pressure—14 MPa (2000 psi);
Parison Drop time—~1.1 sec;
Total Cycle time—~15.30 sec;

Heating Zones:
Feed—330° F.;
Transition—177° C. (350° F.);
Metering 1—190° C. (375° F.);
Metering 2—190° C. (375° F.);
Adaptor—190° C. (375° F.);
Die—190° C. (375° F.);
Timers:
Preblow delay—0.0 sec;
Clamp Pause—0.0 sec;
Charge delay—0.0 sec;
Blow Delay—0.45 sec;
Blow time—10.0 sec;
Exhaust time—2.0 sec;
Shot Delay—0.0 sec.

The said reference resin Petrothene LR732002 is an ethylene polymer produced with a Cr catalyst, having FNCT 6 MPa/50° C., measured as previously described, of about 0.4 hours.

Other features of Petrothene LR732002 are:
Density: 0.953 g/cm³;
MIF: 36 g/10 min;
MIF/MIE: 100;
ER: 5.4.

In these examples, the diameter swell was considered satisfactory when falling within the range of 8 to 10 cm.

Cast Film Measurement

The Film measurement of gels was carried out on an OCS extruder type ME 202008-V3 with 20 mm screw diameter and a screw length of 25 D with a slit die width of 150 mm. The cast line is equipped with a chill roll and winder (model OCS CR-9). The optical equipment consists of a OSC film surface analyzer camera, model FTA-100 (flash camera system) with a resolution of 26 μm×26 μm. After purging the resin first for 1 hour to stabilize the extrusion conditions, inspection and value recording take place for 30 minutes afterwards. The resin was extruded at 220° C. with a take-off speed of ca. 2.7 m/min to generate a film with thickness 50 μm. The chill roll temperature was 70° C.

The said inspection with the surface analyzer camera provided the total content of gels and the content of gels with diameter of higher than 450 μm, as reported in Table 1.

Comonomer Content

The comonomer content was determined by means of IR in accordance with ASTM D 6248 98, using an FT-IR spectrometer Tensor 27 from Bruker, calibrated with a chemometric model for determining butyl-side-chains in PE for hexene as comonomer. The result was compared to the estimated comonomer content derived from the mass-balance of the polymerization process and was found to be in agreement.

Process Setup

The polymerization process was carried out under continuous conditions in a plant comprising two serially connected gas-phase reactors, as shown in the drawing.

The polymerization catalyst was prepared as follows.

Preparation of the Spherical Catalyst Support

A magnesium chloride and alcohol adduct containing about 3 mols of alcohol was prepared following the method described in example 2 of U.S. Pat. No. 4,399,054, but working at a velocity of 2000 RPM instead of 10000 RPM.

The so obtained adduct was dealcoholated up to an amount of alcohol of 25% wt via a thermal treatment, under nitrogen stream, over a temperature range of 50-150° C.

Preparation of the Solid Catalyst Component

Into a 2 L four-necked round flask, purged with nitrogen, 1 L of TiCl$_4$ was introduced at 0° C. Then, at the same temperature, 70 g of a spherical MgCl$_2$/EtOH adduct containing 25% wt of ethanol and prepared as described above were added under stirring. The temperature was raised to 130° C. in 3 hours and maintained for 60 minutes. Then, the stirring was discontinued, the solid product was allowed to settle and the supernatant liquid was siphoned off. Fresh TiCl$_4$ was added up to 1 L total volume and the treatment at 130° C. for 60 minutes was repeated. After settling and siphoning, the solid residue was then washed five times with hexane at 50° C. and two times with hexane at 25° C. and dried under vacuum at 30° C.

Into a 2 L four-necked glass reactor provided with stirrer, 812 cc of hexane at 10° C. and whilst stirring 50 g of the catalyst component prepared as described above were introduced at 10° C. Keeping constant the internal temperature, 15 g of tri-n-octylaluminum (TNOA) in hexane (about 80 g/l) and an amount of cyclohexylmethyl-dimethoxysilane (CMMS) such as to have molar ratio TNOA/CMMS of 50, were slowly introduced into the reactor and the temperature was maintained to 10° C. After 10 minutes stirring, a total amount of 65 g of propylene were introduced into the reactor at the same temperature in 6.5 hours at constant rate. Then, the whole content was filtered and washed three times with hexane at a temperature of 30° C. (100 g/l). After drying the resulting pre-polymerized catalyst (A) was analyzed and found to contain 55% wt of polypropylene, 2.0% wt Ti, 9.85% wt Mg and 0.31% wt Al.

About 100 g of the solid prepolymerized catalyst prepared as described above were charged in a glass reactor purged with nitrogen and slurried with 1.0 L of heptane at 50° C.

Then, ethylacetate (EAA) and tetrahydrofuran (CE) were carefully added dropwise (in 60') in such an amount to have a molar ratio of 4 between Mg/EAA and 4 between Mg and CE.

The slurry was kept under stirring for 1.5 h still having 50° C. as internal temperature. Then, the stirring was discontinued, the solid product was allowed to settle and the supernatant liquid was siphoned off. The solid was washed under stirring one time adding anhydrous heptane at 50° C. up to 1 L of volume and then the stirring was discontinued, the solid product was allowed to settle and the supernatant liquid was siphoned off. Then the volume was restored to 1 L with anhydrous heptane and the temperature was raised up to 85° C. and maintained under stirring for 2 hours. Then, the stirring was discontinued, the solid product was allowed to settle and the supernatant liquid was siphoned off.

The solid was washed 3 times with anhydrous hexane (3×1000 mL) at 25° C., recovered, dried under vacuum and analyzed and the resulting EAA/CE molar ratio was found 0.93.

Example 1—Reference

A polyethylene was prepared in a cascade of a fluidized-bed reactor and a multizone circulating reactor having two interconnected reaction zones as shown in the drawing.

For carrying out the polymerization, 9.8 g/h of the solid catalyst prepared as described above were fed using 0.75 kg/h of liquid propane to a first stirred precontacting vessel, into which also a mixture of triisobuthyllaluminum (TIBA) and diethylaluminumchloride (DEAC) were dosed. The weight ratio between trisiobutylaluminum and diethylaluminumchloride was 7:1. The ratio between aluminum alkyl to the solid catalyst was 5:1. The first precontacting vessel was kept at 50° C. with an average residence time of 35 minutes. The catalyst suspension of the first precontacting vessel was continuously transferred to a second stirred precontacting vessel, which was operated with an average residence time of 35 minutes and kept also at 50° C. The catalyst suspension was then transferred continuously to fluidized-bed reactor (FBR) (1) via line (2).

In fluidized-bed reactor (1), ethylene was polymerized in the presence of propane as inert diluent using hydrogen as molecular weight regulator. 47.5 kg/h of ethylene, 175 g/h of hydrogen and 11 kg/h of propane were fed to fluidized-bed reactor (1) via line 3. No comonomer was added. The polymerization was carried out at a temperature of 80° C. and a pressure of 3.0 MPa. The selected feed rates resulted in an ethylene concentration in the reactor of 10.9 vol.-% and a molar ratio of hydrogen/ethylene in the reactor of 2.6.

The polyethylene obtained in fluidized-bed reactor (1) had a MIE of 76 g/10 min and a density of 0.967 g/cm$^3$.

The polyethylene obtained in fluidized-bed reactor (1) was continuously transferred to multizone circulating reactor (MZCR), which was operated at a pressure of 2.6 MPa and a temperature of 85° C. measured at the gas exit from reactor. The riser (4) has an internal diameter of 200 mm and a length of 19 m. The downcomer (5) has a total length of 18 m, an upper part of 5 m with an internal diameter of 300 mm and a lower part of 13 m with an internal diameter of 150 mm. In order to broaden the molecular weight distribution of the final ethylene polymer, the second reactor was operated by establishing different conditions of monomers and hydrogen concentration within the riser (4) and the downcomer (5). This is achieved by feeding, via line (7), 330 kg/h of a liquid stream (liquid barrier) into the upper part of the downcomer (5). The liquid stream of line 19 comes from the condensation step in the condenser 6, at working conditions of 56° C. and 2.6 MPa, wherein a part of the recycle stream is cooled and partially condensed. As shown in the figure, a pump is placed downstream the condenser 6.

The monomers to the downcomer were fed in 3 positions. In dosing point 1 (8) 25 kg/h of liquid condensate (10), 9 kg/h of ethylene (9) and 1025 g/h of 1-hexene (9) were introduced. In dosing point 2 (11) 15 kg/h of liquid condensate (13) and 4.5 kg/h of ethylene (12) were introduced. In dosing point 3 (14) 15 kg/h of liquid condensate (16) and 4.5 kg/h of ethylene (15) were dosed. 5 kg/h of propane, 27.8 kg/h of ethylene and 34 g/h of hydrogen were fed through line 19 into the recycling system.

The final polymer was discontinuously discharged via line 18.

The first reactor produced around 50% by weight (split wt %) of the total amount of the final polyethylene resin produced by both first and second reactors.

The obtained precursor polyethylene composition (I) had a final MIF of 39.6 g/10 min. The obtained density was 0.954 g/cm$^3$.

The comonomer (hexene-1) amount was of about 1.05% by weight.

A portion of the obtained polymer powder (as polymerized, i.e. without additives) was finally extruded on a Kobe mixer LCM80, adding the following additives:

1000 ppm Ca-Stearate;

800 ppm Irganox 1010; and 1600 ppm Irgafos 168 (all ppm by weight).

Irganox 1010® is 2,2-bis[3-[,5-bis(1,1-dimethylethyl)-4-hydroxyphenyl)-1-oxopropoxy]methyl]-1,3-propanediyl-3,5-bis(1,1-dimethylethyl)-4-hydroxybenzene-propanoate, supplied by BASF SE, Ludwigshafen, Germany.

Irgafos 168® is tris (2,4-di-tert-butylphenyl) phosphite, marketed by Ciba Geigy.

The polymer powder and said additives were introduced to the inlet of the mixer at a rate of 170 kg/h and a screw speed of 800 rpm. In between the 2 mixing zones is located a throttling gate which was adjusted to a position to get a temperature of 220° C. in front of the gate. Behind the second mixing zone is located a gear pump which was set at 0.1 MPa (1.0 bar) suction pressure.

Polymerization conditions and polymer data (after extrusion) are reported in Table 1.

Example 2—Comparison

A portion of the polymer powder of Example 1 (as polymerized) was extruded with 1000 ppm Ca-Stearate, 800 ppm Irganox 1010, 1600 ppm Irgafos 168 and 133 ppm of Pergaprop 7.5 PP (all ppm by weight).

Pergaprop 7.5 PP® is a 7.5 wt. % mixture of 2,5-dimethyl-2,5-di-(tert.-butylperoxy)-hexane with polypropylene, supplied by PERGAN GmbH, Bocholt, Germany.

The same extrusion equipment and conditions as in Example 1 were used.

The polymer data are reported in Table 1.

Example 3—Comparison

A portion of the polymer powder of Example 1 (as polymerized) was extruded with 1000 ppm Ca-Stearate, 800 ppm Irganox 1010, 1600 ppm Irgafos 168 and 267 ppm of Pergaprop 7.5 PP (all ppm by weight).

The same extrusion equipment and conditions as in Example 1 were used.

Example 4

A portion of the polymer powder of Example 1 (as polymerized) was extruded with 1000 ppm Ca-Stearate, 800 ppm Irganox 1010, 1600 ppm Irgafos 168 and 400 ppm of Pergaprop 7.5 PP (all ppm by weight).

The same extrusion equipment and conditions as in Example 1 were used.

The polymer data are reported in Table 1.

Example 5

A portion of the polymer powder of Example 1 (as polymerized) was extruded with 1000 ppm Ca-Stearate, 800 ppm Irganox 1010, 1600 ppm Irgafos 168 and 533 ppm of Pergaprop 7.5 PP (all ppm by weight).

The same extrusion equipment and conditions as in Example 1 were used.

The polymer data are reported in Table 1.

Example 6

A portion of the polymer powder of Example 1 (as polymerized) was extruded with 1000 ppm Ca-Stearate, 800 ppm Irganox 1010, 1600 ppm Irgafos 168 and 800 ppm of Pergaprop 7.5 PP (all ppm by weight).

The same extrusion equipment and conditions as in Example 1 were used.

The polymer data are reported in Table 1.

TABLE 1

| | Ex. 1 | Ex. 2 | Ex. 3 | Ex. 4 | Ex. 5 | Ex. 6 |
|---|---|---|---|---|---|---|
| Operative conditions first reactor | | | | | | |
| $H_2/C_2H_4$ Molar ratio | 2.6 | — | — | — | — | — |
| $C_2H_4$ % | 10.9 | — | — | — | — | — |
| Density of A) [g/cm$^3$] | 0.967 | — | — | — | — | — |
| MIE of A) [g/10 min.] | 76 | — | — | — | — | — |
| Split [wt. %] | 50 | — | — | — | — | — |
| Operative conditions second reactor | | | | | | |
| $H_2/C_2H_4$ Molar ratio riser | 0.42 | — | — | — | — | — |
| $C_2H_4$ % riser | 10.3 | — | — | — | — | — |
| $C_6H_{12}$ % riser | 0.33 | — | — | — | — | — |
| $H_2$ % downcomer | 0.11 | — | — | — | — | — |
| Final Polymer properties | | | | | | |
| Peroxide content [ppm] | 0 | 10 | 20 | 30 | 40 | 60 |
| MIF [g/10 min.] | 39.6 | 36.3 | 35.2 | 32.7 | 31.0 | 29.9 |
| MIP [g/10 min.] | 1.72 | 1.49 | 1.42 | 1.25 | 1.15 | 1.06 |
| MIF/MIE | 110 | 125 | 130 | 136 | 141 | 157 |
| Density (g/cm$^3$) | 0.954 | 0.954 | 0.954 | 0.953 | 0.953 | 0.953 |
| Mn [g/mol] | 9352 | 9813 | 9206 | 9761 | 9592 | 9498 |
| Mw [g/mol] | 260619 | 273450 | 249227 | 286976 | 278268 | 271084 |
| Mw/Mn | 27.8 | 27.9 | 27.1 | 29.4 | 29.01 | 28.5 |
| LCBI | 0.62 | 0.65 | 0.71 | 0.65 | 0.71 | 0.69 |
| $\eta_{0.02}$ | 42904 | 52845 | 57127 | 64675 | 69299 | 76145 |
| $(\eta_{0.02}/1000)$/LCBI | 67.0 | 81.3 | 78.3 | 99.5 | 97.6 | 110.4 |
| HMW COPO Index | 1.6 | 2.5 | 2.2 | 3.2 | 2.5 | 3.1 |
| ER | 3.4 | 4.3 | 4.8 | 5.5 | 6.2 | 6.9 |
| Swell ratio [%] | 193 | 192 | 188 | 183 | 180 | 175 |
| FNCT 6 MPa/ 50° C. [h]* | 81 | 86 | 75 | 83 | 71 | 68 |
| Uniloy data | | | | | | |
| Weight swell [g] | 4.8 | −1.8 | −0.5 | −4.4 | −6.7 | −9.0 |
| Diameter swell [cm] | 12.0 | 11.6 | 10.5 | 9.3 | 8.4 | 8.0 |
| (MIF/MIE)/ER | 32.4 | 29.1 | 27 | 24.7 | 22.7 | 22.8 |
| Gels >450 μm [1/m$^2$] | 1.3 | 2.0 | 1.3 | 1.3 | 3.0 | 0.7 |
| Gels total [1/m$^2$] | 242.0 | 291.9 | 188.6 | 302.6 | 225.3 | 209.3 |

Notes:
$C_2H_4$ = ethylene;
$C_6H_{12}$ = hexene;
*aqueous solution of 2% Arkopal N100

What is claimed is:

1. A polyethylene composition having the following features:

1) a ratio MIF/MIE from greater than 125 to 180, where MIF is the melt flow index measured at 190° C. with a load of 21.60 kg, and MIE is the melt flow index measured at 190° C. with a load of 2.16 kg, both determined according to ISO 1133-1 2012-03;

2) a MIF from 20 to 40 g/10 min.;

3) a density from 0.948 to 0.960 g/cm$^3$, determined according to ISO 1183-1:2012 at 23° C.;

4) an ER value from 5 to 10;

wherein the ER is calculated according with an equation as follows ;

$$ER=(1.781*10^{-3})*G'$$

at a value of G"=5,000 dyn/cm$^2$;

wherein:

G'=storage-modulus;

G"=loss-modulus;

both G' and G" being measured with dynamic oscillatory shear in a plate-plate rotational rheometer at a temperature of 190° C.

2. The polyethylene composition of claim 1, wherein the polyethylene composition is formed by contacting a precursor polyethylene composition (I) with a radical initiator, wherein the precursor polyethylene composition (I) has a ratio MIF/MIE 1I) lower than MIF/MIE 1) and from 90 to 120;

wherein the ratio 1)/1$^I$), which is between the MIF/MIE 1) of the final polyethylene composition (after contacting with the radical initiator) and the MIF/MIE 1$^I$) of the precursor polyethylene composition (I), is equal to or greater than 1.05, preferably equal to or greater than 1.1, in particular from 1.05 or from 1.1 to 1.8, or from 1.05 or from 1.1 to 1.6.

3. The polyethylene composition of claim 2, wherein the precursor polyethylene composition (I) has:

2$^I$) a MIF from 30 to 50 g/10 min.;

3$^I$) a density from 0.948 to 0.960 g/cm$^3$;

4$^I$)ER value from 2 to 5.

4. The polyethylene composition of claim 2, wherein the precursor polyethylene composition (I) comprises:

A) 30-70% by weight, of an ethylene homopolymer or copolymer, wherein the ethylene homopolymer or copolymer has a density equal to or greater than 0.960 g/cm$^3$ and melt flow index MIE measured at 190° C. with a load of 2.16 kg, according to ISO 1133, of 40 g/10 min. or higher;

B) 30-70% by weight, of an ethylene copolymer having a MIE value lower than 0.5 g/10 min.

5. The polyethylene composition of claim 1, obtained by using, in the polymerization stage, a Ziegler-Natta polymerization catalyst.

6. The polyethylene composition of claim 5, wherein the Ziegler-Natta polymerization catalyst comprises the product of reaction of:

A) a solid catalyst component comprising Ti, Mg, chlorine and one internal electron donor ED selected from esters of aliphatic monocarboxylic acids (EAA) and another internal donor ED$^I$ selected from cyclic ethers (CE) in an amount such that the EAA/CE molar ratio ranges from 0.02 to less than 20;

B) an organo-Al compound; and optionally

C) an external electron donor compound.

7. The polyethylene composition of claim 1, consisting of or comprising one or more ethylene copolymers.

8. The polyethylene composition of claim 1, having at least one of the following additional features:

a swell ratio equal from 160% to 200%;

a FNCT 6 MPa/50° C. from 40 to 100 h;

a comonomer content equal to or less than 1.7% by weight, with respect to the total weight of the polyethylene composition;

a MIP of 0.3 g/10 min. to 4 g/10 min., wherein the MIP is the melt flow index measured at 190° C. with a load of 5 kg, determined according to ISO 1133-1 2012-03;

a ratio (MIF/MIE)/ER, which is between MIF/MIE and ER, and is from 15 to 26;

a long chain branching index LCBI from 0.55 to 0.95;

wherein the LCBI is the ratio of the measured mean-square radius of gyration Rg, measured by GPC-MALLS, to the mean-square radius of gyration for a linear PE having the same molecular weight at a mol. weight of 1,000,000 g/mol;

a $\eta_{0.02}$ from 56,000 to 80,000 Pa·s;

wherein the $\eta_{0.02}$ is the complex viscosity of the melt, measured at a temperature of 190° C., in a parallel-plate (or so-called plate-plate) rheometer under dynamic oscillatory shear mode with an applied angular frequency of 0.02 rad/s;

a ratio ($\eta_{0.02}$/1000)/LCBI, which is between $\eta_{0.02}$ divided by 1000 and LCBI, from 85 to 150;

a HMWcopo index from 0.5 to 5;

wherein the HMWcopo index is determined according to the following formula:

$$HMWcopo=(\eta_{0.02} \times t_{maxDSC})/(10^5)$$

whereinh $t_{maxDSC}$ is the time, in minutes, required to reach the maximum value of heat flow (in mW) of crystallization (time at which the maximum crystallization rate is achieved, equivalent to the t½ crystallization half-time) at a temperature of 124° C. under quiescent conditions, measured in isothermal mode in a differential scanning calorimetry apparatus, DSC.

9. A manufactured article comprising the polyethylene composition of claim 1.

10. The manufactured article of claim 9, wherein the manufactured article is a blow molded article and is handleware.

* * * * *